UNITED STATES PATENT OFFICE.

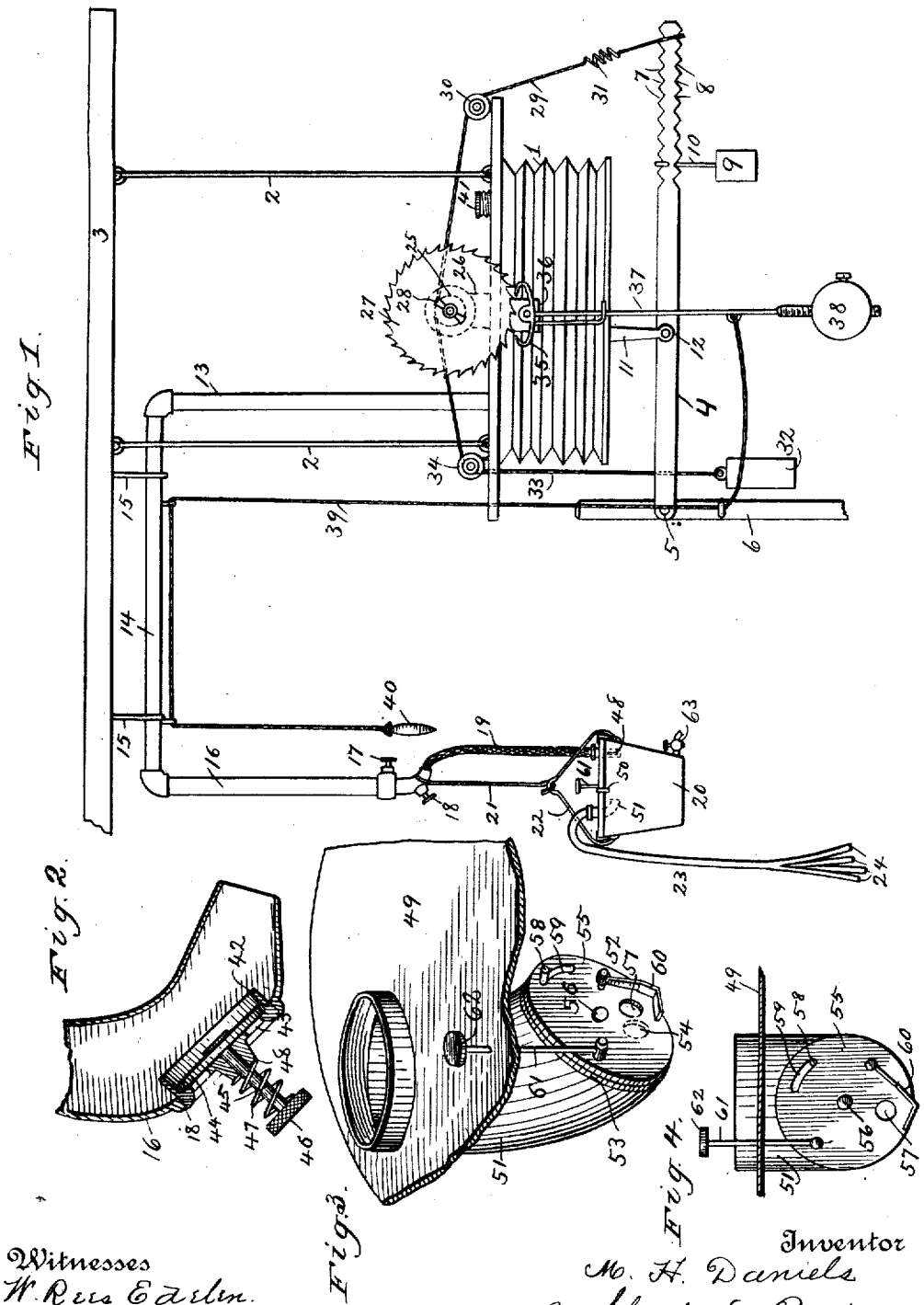

MONROE H. DANIELS, OF WAVERLY, IOWA.

COW-MILKING DEVICE.

No. 843,446.   Specification of Letters Patent.   Patented Feb. 5, 1907.

Application filed May 21, 1906. Serial No. 318,028.

*To all whom it may concern:*

Be it known that I, MONROE H. DANIELS, a citizen of the United States, residing at Waverly, in the county of Bremer and State of Iowa, have invented certain new and useful Improvements in Cow-Milking Devices, of which the following is a specification.

This invention relates to new and useful improvements in cow-milking devices, and pertains particularly to a type of construction in which a suction-bellows is provided, which carries a pipe or tube designed to have connection with the udders of the animals in order to draw the milk therefrom.

In connection with an apparatus of the above type means are provided for stopping the milking operation when the receptacle into which the milk is discharged is filled to a predetermined degree or when the flow of milk ceases from the animal. Means are further provided for regulating the suction from the bellows or pump, comprising a safety-valve designed to be opened when the suction has reached a selected degree.

The detailed construction will appear in the course of the following description, in which reference is had to the accompanying drawings, forming a part of this specification, like numerals designating like parts throughout the several views, wherein—

Figure 1 is a view illustrating in side elevation a complete apparatus constructed in accordance with my invention. Fig. 2 is a central longitudinal section illustrating the detailed construction of the safety-valve forming a part of my invention. Fig. 3 is a fragmentary perspective view of the top of the milk-receptacle, illustrating an automatic valve for stopping the operation of the pump when the flow of milk from the animal ceases; and Fig. 4 is a front elevation thereof.

In the practical embodiment of my invention I employ a suction-bellows 1, suspended by vertical hangers 2 from a suitable support 3. The bellows 1 is positively operated from a rod 4, fulcrumed, as at 5, to a supporting-post 6 and formed at its free ends with corrugations 7 and 8 on the respective upper and lower edges thereof. For the purpose of giving power to the rod 4 a weight 9 is provided, which adjustably depends therefrom by a hook 10, designed to engage a selected one of the corrugations 7. The rod 4 has connection with the bottom of the bellows 1 by virtue of a loop 11, to which said rod is fulcrumed, as at 12. The bellows 1 has connection at its top with a pipe 13, provided with a horizontal arm 14, which is engaged by hangers 15, depending from the support 3. The pipe 13 terminates in a depending arm 16, which adjacent to its extremity is provided with a hand-valve 17 and an automatic safety-valve 18 for regulating the flow of air therethrough. The pipe 16 has connection with a flexible tube 19, leading to a milk-pail 20, suspended from the pipe 16 by a hook 21, engaging the bail 22 of said pail. A pipe 23 leads from the pail 20 and terminates in a plurality of tubes or mouths 24, which are secured to the udders of the cow or other animal to be milked.

The above elements constitute in general the main parts of the invention, which in performance of their functions are provided with a number of devices to be hereinafter described in detail and specifically referred to in the figures in which they are illustrated.

The action of the bellows 1 under the influence of the weighted rod 4 is controlled by an escapement mechanism comprising a reel 25, transversely journaled in vertical brackets 26, carried upon the top of the bellows 1. The reel 25 carries at its end an escapement-wheel 27, removably secured thereon by a set-nut 28. The rod 4 has connection with the reel 25 by virtue of a cord 29, adjustably engaging at one end the corrugations 8 of said rod and being trained over a sheave 30, carried upon the top of the bellows 1, the other end of said cord engaging and being rigidly secured to the reel 25. For the purpose of cushioning the action of the rod 4 upon the reel, so as not to jar the same in its bearings, a spring 31 is interposed at a desired point in the cord 29. The action of the rod 4 is counterbalanced by weight 32, suspended from a cord 33, trained over a sheave 34, carried upon the top of the bellows 1, and trained over the reel 25 in an opposite direction from the cord 29. The ratchet-wheel 27 is engaged by a double escapement-pawl 35, pivotally mounted in a depending bracket 36, provided with a pendulum 37 of approved form carrying an adjustable weight 38. The apparatus is started in its action by manually-operated means, comprising a suitably-supported pull-cord 39, provided at its end with a handle 40. The bellows 1 is provided with a check-valve 41 of approved form, through which the air contained therein egresses when the bellows is contracted.

The automatic safety-valve 18 is illustrated in detail in Fig. 2 and comprises a cup-shaped member 42, fitted into the pipe 16 and formed in its exposed surface with air-inlet openings 43, which are normally closed by a reciprocating disk valve 44, slidable within the annular wall of the member 42 and carrying a stem 45, threaded into said valve 44 and terminating in a milled head 46. An expansive coil-spring 47 surrounds the stem 45 and imparts a tension to the valve 44 in its action. The tension of the spring 47 is regulated by turning the threaded rod 45.

The flexible tube 19 terminates in a float-valve 48 of any approved form, which is designed to be closed by the milk when it has reached a predetermined height in the pail to cut off suction from the bellows 1. The valve 48 is, more strictly speaking, carried by a top 49, designed to be secured by clips 50 to the pail 20 in such a manner that an airtight joint is effected between said pail and said top 49.

The pipe 23 has connection with the lid 49, which adjacent to said pipe is provided with an inwardly-extending pipe-section 51, terminating in a liquid-controlled valve 52 of novel construction, designed to be closed when the milk ceases to flow from the udders of the animal and to stop the suction of the bellows 1. The valve 52 comprises a disk or a disk cap 53, as desired, rigidly secured to the pipe-section 51 and provided in its lower half with an opening 54. A disk 55 is pivotally connected to the disk 53 at a central point, as at 56, and is provided with an opening 57, adapted to be brought into registry with the opening 54 in the movement of the disk 55 upon its pivot. The movement of the disk 55 in either direction upon its pivot is controlled by a pin 58, rigidly carried by the disk 53 and projecting through an arc-shaped slot 59, formed in the disk 55. Said disk 55 carries a rigid element 60, terminating in a V-shaped extremity disposed adjacent to the opening 57 and designed to be engaged by the milk discharged through the openings 54 and 57 in their registering relation with a gravitating action. For the purpose of initially effecting a registering relation between the openings 54 and 57 a stem 61 is pivoted to the face of the disk 55 and projects through the top 49, said stem carrying at its upper end an enlarged weighted head 62.

In operation the pull-cord 39 is grasped by the handle 40 and moved to oscillate the pendulum 37. The oscillation of the pendulum 37 releases the escapement-wheel 27, and the weighted rod 4 acts by gravity to expand the bellows 1 in a series of vibratory movements as controlled by the escapement-wheel 27 and pawl 35. It is of course to be understood that in the gravitating movement of the rod 4 upon its fulcrum the reel 25 is rotated, carrying the escapement-wheel 27 therewith and winding the counterbalance-weight 32 upon said reel. As the bellows expands a suction will be created from the various pipes herein set forth, whereby the milk from the udders of the cow will be drawn into the pail 20 and from which it may be discharged by a drain-cock 63. When the pail is filled to a predetermined limit, the float-valve 48 is operated by the milk as it rises in said pail to close the mouth of the tube 19 and to stop the suction upon the udders of the cow. In starting the device the disk 55 is moved to the position of Fig. 4 by raising the stem 61 and is held manually in such position until the milk starts to flow, and the falling milk impinges upon the element 60 with a gravitating action and maintains the valve 52 in the position of Fig. 4. When the milk ceases to flow from the udders of the cow, the weighted pin 61 drops by gravity and rocks the disk 55 upon its fulcrum 56, so as to move the opening 57 out of registry with the opening 54, and thereby stop the suction upon the udders of the cow. It will thus be seen that when the rod 4 has reached the limit of its downward movement the weight 32 will be wound upon the reel 25. In restoring the bellows to initial position the rod 4 is lifted manually, and the weight 32 gravitates until the cord 33 is unwound from the reel 25. The pendulum 37 assumes a perpendicular position, so that movement of the escapement-wheel, the reel, and devices suspended therefrom is prevented until the pendulum is manually moved, as above set forth.

While the elements herein shown and described are well adapted to serve the functions set forth, it is obvious that various minor changes may be made in the proportions, shape, and arrangement of the several parts without departing from the spirit and scope of the invention as defined in the appended claims.

Having fully described my invention, I claim—

1. A device of the type set forth comprising a suction-bellows, means for operating same, an escapement device for regulating the action of said bellows, a container, a conductor having air-tight connection with said container and leading to said bellows, and devices carried by said container and designed to engage the udder of an animal to conduct milk therefrom into said container, under the influence of said bellows.

2. A device of the type set forth comprising a suction-bellows, means for operating same, a container having air-tight communication with said bellows, conductor-tubes leading from said container and designed to engage the udders of an animal, liquid-controlled means for maintaining communication between said conductor-tubes and said container, and means for interrupting communication therebetween upon the cessation of the flow of the liquid from the animal.

3. A device of the type set forth comprising a suction-bellows, means for operating the same, a container having air-tight communication with said bellows, conductor-tubes leading from said container and designed to engage the udders of an animal, and liquid-controlled means for interrupting communication between said container and said bellows, when the liquid in said container shall have reached a selected height.

4. A device of the type set forth comprising a suction-bellows, means for operating the same, a container, a conductor having air-tight connection with said container and leading to said bellows, conductors carried by said container and designed to engage the udders of an animal, and a regulatable safety-valve interposed in said first-named conductor and designed to open under a predetermined degree of suction.

In testimony whereof I affix my signature in presence of two witnesses.

MONROE H. DANIELS.

Witnesses:
  W. C. SCHLABERG,
  C. C. KOHAGEN.